US012771541B2

(12) United States Patent
Cheng

(10) Patent No.: US 12,771,541 B2
(45) Date of Patent: Oct. 20, 2026

(54) METHODS FOR ENCRYPTION VALIDATION

(71) Applicant: eBay Inc., San Jose, CA (US)

(72) Inventor: Liang Cheng, Los Altos, CA (US)

(73) Assignee: eBay Inc., San Jose, CA (US)

( * ) Notice: Subject to any disclaimer, the term of this patent is extended or adjusted under 35 U.S.C. 154(b) by 400 days.

(21) Appl. No.: 17/975,544

(22) Filed: Oct. 27, 2022

(65) Prior Publication Data

US 2024/0146530 A1 May 2, 2024

(51) Int. Cl.
*H04L 9/32* (2006.01)
*H04L 9/08* (2006.01)

(52) U.S. Cl.
CPC .............. *H04L 9/32* (2013.01); *H04L 9/0894* (2013.01)

(58) Field of Classification Search
CPC ............ H04L 9/08; H04L 9/0894; H04L 9/32
See application file for complete search history.

(56) References Cited

U.S. PATENT DOCUMENTS 8,799,671 B2 8/2014 Conte et al.
8,935,802 B1 1/2015 Mattsson et al.
9,020,262 B2 * 4/2015 Depalov ............... H04N 19/13 382/176
9,191,400 B1 11/2015 Ptasinski et al.
10,990,675 B2 4/2021 Hansen
11,010,490 B1 5/2021 Pham et al.
11,023,327 B2 6/2021 Linnen et al.
11,379,289 B2 7/2022 LeCrone et al.
2017/0124558 A1 5/2017 Molnar et al.
2017/0264427 A1 * 9/2017 Hollis .................. H04L 9/0869
2018/0285575 A1 * 10/2018 Marchese ............... G06F 21/79
2020/0097650 A1 3/2020 Golan et al.
2020/0210390 A1 7/2020 Huang et al.
(Continued)

OTHER PUBLICATIONS

Netwrix, Netwrix Auditor: Detect Security Threats, Prove Compliance and Increase IT Team Efficiency, downloaded Sep. 12, 2022 from internet: https://www.netwrix.com/download/Datasheets/Netwrix_Auditor_Datasheet.pdf, 17 pages.
(Continued)

*Primary Examiner* — Khoi V Le
*Assistant Examiner* — Ayub A Maye
(74) *Attorney, Agent, or Firm* — Shook Hardy & Bacon L.L.P.

(57) ABSTRACT

Online platforms such as online marketplaces may collect sensitive data, such as personal identifiable information or financial information. A data owner (e.g., an operator of an online platform) may encrypt sensitive data prior to storing the data in a persistent data store. An encryption validation method may be performed check whether a data set is encrypted prior to storing the data in the persistent data store. For example, for a data set that includes a set of character strings, the encryption validation method may check whether entropy of corresponding positions of the set of character strings satisfies a threshold (e.g., is within a threshold of a benchmark entropy value) to determine whether the data set is encrypted or sufficiently encrypted (e.g., by checking whether the data set is sufficiently randomized).

18 Claims, 11 Drawing Sheets

(56) References Cited

U.S. PATENT DOCUMENTS

| | | | | |
|---|---|---|---|---|
| 2021/0092141 | A1* | 3/2021 | Gamble | H04L 63/1433 |
| 2023/0306108 | A1* | 9/2023 | Veprinsky | G06F 21/552 |

OTHER PUBLICATIONS

Zoho Corp, ManageEngine—Endpoint DLP Plus, downloaded Sep. 12, 2022 from internet: https://www.manageengine.com/endpoint-dlp/?utm_source=Comparitech&utm_medium=Website-cpc&utm_campaign=EDLP-GDPRComp, 2022, 7 pages.

Solarwinds Worldwide, LLC, Lightweight, Easy-to-Use Data Loss Prevention Software, downloaded Sep. 12, 2022 from internet: https://www.solarwinds.com/access-rights-manager/use-cases/data-loss-prevention?a_bid=27f1527d&CMP=BIZ-PAP-CMPRTCH- data_loss_prvn-ARM-UC&data1=235813&data2=list_dd_d_post_235813&a_ai=BIZ-PAP-CMPRTCH, 8 pages.

* cited by examiner

METHODS FOR ENCRYPTION VALIDATION

FIELD OF TECHNOLOGY

The present disclosure relates generally to database systems and data processing, and more specifically to methods for encryption validation.

BACKGROUND

An online platform such as an online marketplace may receive sensitive data from customers (e.g., buyers or sellers). For example, sensitive information may include personal identifiable information, such as names, addresses, or birth dates, or financial information, such as credit card numbers or bank account numbers. Financial and/or privacy laws and regulations may require that data owners, such as online marketplace, encrypt sensitive information prior to storage of the sensitive information. Traditional methods of checking whether data is encrypted may be tedious and/or subject to data leaks.

SUMMARY

A method is described. The method may include receiving a data set including a set of character strings, calculating a benchmark entropy value for the set of character strings based on a set of possible characters for corresponding positions of the set of character strings, calculating an observed entropy value for each corresponding position of the set of character strings based on actual characters included in the set of character strings, comparing the observed entropy value for each corresponding position of the set of character strings to the benchmark entropy value, and outputting an encryption indication for the data set based on the comparison.

An apparatus is described. The apparatus may include a processor, memory coupled with the processor, and instructions stored in the memory. The instructions may be executable by the processor to cause the apparatus to receive a data set including a set of character strings, calculate a benchmark entropy value for the set of character strings based on a set of possible characters for corresponding positions of the set of character strings, calculate an observed entropy value for each corresponding position of the set of character strings based on actual characters included in the set of character strings, compare the observed entropy value for each corresponding position of the set of character strings to the benchmark entropy value, and output an encryption indication for the data set based on the comparison.

Another apparatus is described. The apparatus may include means for receiving a data set including a set of character strings, means for calculating a benchmark entropy value for the set of character strings based on a set of possible characters for corresponding positions of the set of character strings, means for calculating an observed entropy value for each corresponding position of the set of character strings based on actual characters included in the set of character strings, means for comparing the observed entropy value for each corresponding position of the set of character strings to the benchmark entropy value, and means for outputting an encryption indication for the data set based on the comparison.

A non-transitory computer-readable medium storing code is described. The code may include instructions executable by a processor to receive a data set including a set of character strings, calculate a benchmark entropy value for the set of character strings based on a set of possible characters for corresponding positions of the set of character strings, calculate an observed entropy value for each corresponding position of the set of character strings based on actual characters included in the set of character strings, compare the observed entropy value for each corresponding position of the set of character strings to the benchmark entropy value, and output an encryption indication for the data set based on the comparison.

In some examples of the method, apparatuses, and non-transitory computer-readable medium described herein, each possible character of the set of possible characters may be equally likely to occur at each character position in the set of character strings.

In some examples of the method, apparatuses, and non-transitory computer-readable medium described herein, comparing the observed entropy value for each corresponding position of the set of character strings to the benchmark entropy value may include operations, features, means, or instructions for determining whether a respective difference between the observed entropy value for each corresponding position of the set of character strings and the benchmark entropy value satisfies a threshold.

In some examples of the method, apparatuses, and non-transitory computer-readable medium described herein, outputting the encryption indication may include operations, features, means, or instructions for outputting an indication that the data set may be encrypted based on each respective difference satisfying the threshold.

Some examples of the method, apparatuses, and non-transitory computer-readable medium described herein may further include operations, features, means, or instructions for writing the data set to a storage repository based on the indication that the data set may be encrypted.

In some examples of the method, apparatuses, and non-transitory computer-readable medium described herein, outputting the encryption indication may include operations, features, means, or instructions for outputting an indication that the data set may be not encrypted based on at least one respective difference not satisfying the threshold.

Some examples of the method, apparatuses, and non-transitory computer-readable medium described herein may further include operations, features, means, or instructions for moving the data set from a first storage repository to a second storage repository via a network based on the indication that the data set may be not encrypted, where the data set may be received from the first storage repository.

Some examples of the method, apparatuses, and non-transitory computer-readable medium described herein may further include operations, features, means, or instructions for running the data set through an encryption program to generate a second data set based on the indication that the data set may be not encrypted.

Some examples of the method, apparatuses, and non-transitory computer-readable medium described herein may further include operations, features, means, or instructions for writing the second data set to a storage repository.

In some examples of the method, apparatuses, and non-transitory computer-readable medium described herein, iteratively running the data set through an encryption program and checking the data set for an indication that the data set may be encrypted.

DETAILED DESCRIPTION

Figure 1:
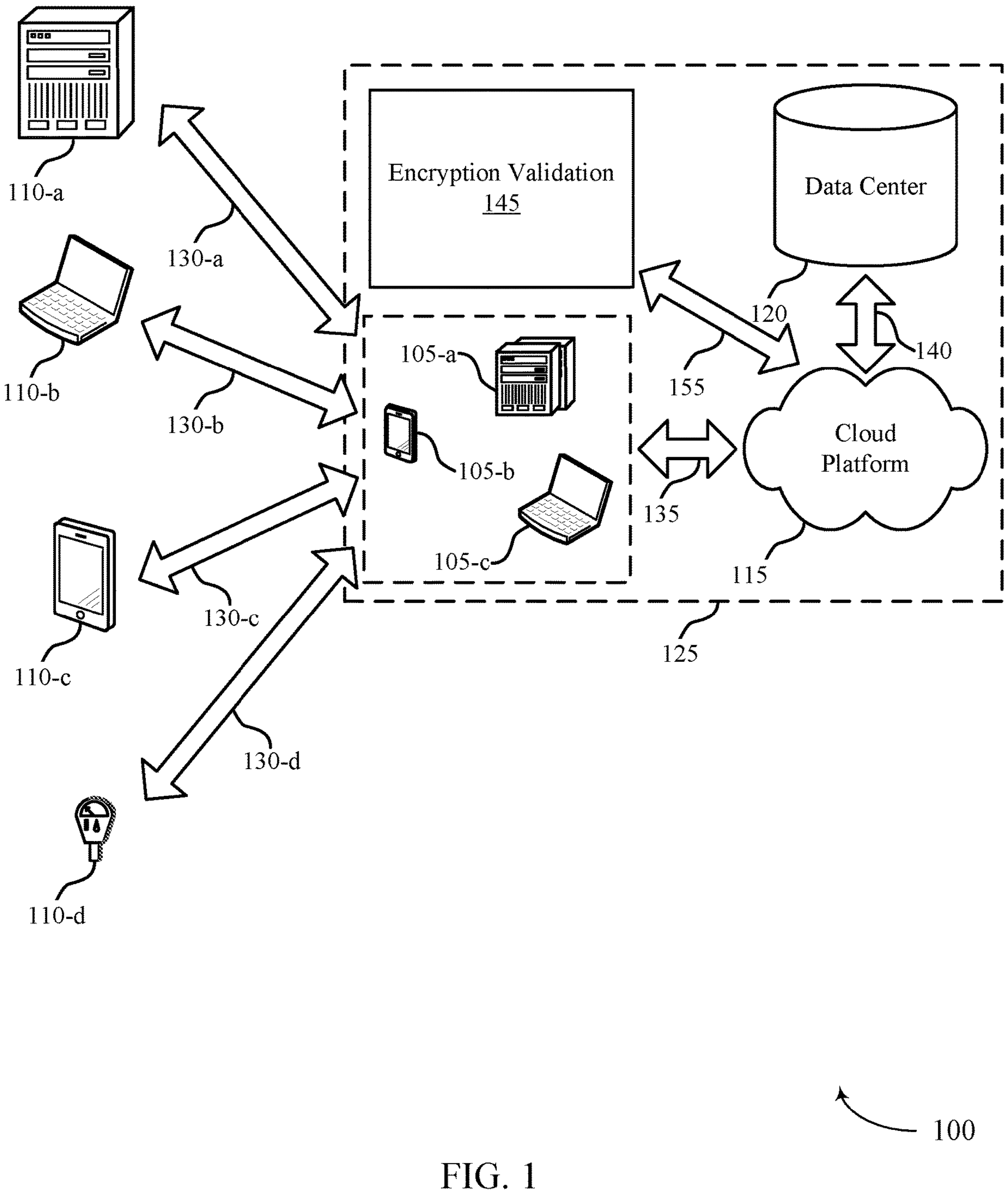
FIG. 1 illustrates an example of an encryption validation system that supports methods for encryption validation in accordance with aspects of the present disclosure.

An online platform such as an online marketplace may receive sensitive data from customers (e.g., buyers or sellers). A data owner, (such as operator of an online marketplace) may encrypt sensitive data before writing the sensitive data to a persistent data store. For example, financial regulations and privacy laws, such as the Payment Card Industry Data Security Standard (PCI-DSS), the General Data Protection Regulation, the New York Department of Financial Services (NYDFS) Cybersecurity Act, and the California Consumer Privacy Act (CCPA) may require that personal identifiable information and/or financial information be encrypted. An internal data owner (e.g., the application that receives sensitive data) may run an encryption program on sensitive data before writing the sensitive data to a database to tokenize or encrypt the data. Without using metadata to determine whether a specific data column was transformed properly (e.g., is actually encrypted), there may be no automated way to determine whether sensitive data was actually encrypted (e.g., whether the data was actually run through an encryption program and/or whether the encryption program sufficiently encrypted the sensitive data). Pattern matching methods (e.g., Regex) may be used to check encryption. Pattern matching methods may be voided when the data transformation adopts format preserving encryption (FPE), however. Further, human checking of data columns to see whether the data was actually encrypted may be tedious and subject to data leakage.

Entropy is a measure of the randomness of a data set. Any human or computer generated set of data has some statistical pattern. The statistical patterns reduce entropy of a data set. A byproduct of a strong encryption program is introducing randomness into the data set. A data set may include a set of character strings (e.g., a set of credit card numbers or a set of bank account numbers). An automated encryption validation method may calculate the observed entropy for corresponding positions of the character strings of the data set (e.g., the observed entropy of the first position of all the character strings, the observed entropy of the second position of all the character strings, etc.) and compare the observed entropy for the corresponding positions to an entropy benchmark for the data set to determine whether the data set is encrypted.

For example, the entropy benchmark may represent the determined entropy of a position of the character string if all of the characters for that position of the character strings in the data set were completely random. If the observed entropy of each corresponding position of the character strings is within a threshold of the entropy benchmark (or if the position with the lowest observed entropy value is within the threshold of the entropy benchmark), the automated encryption validation method may determine that the data set was sufficiently encrypted. If the automated encryption validation method determines that the data set was sufficiently encrypted, a data management system may write the data set to a storage repository. If the observed entropy of each corresponding position of the character strings is not within a threshold of the entropy benchmark, the automated encryption validation method may determine that the data set was not sufficiently encrypted. In such cases, the automated encryption validation method may apply an encryption program to the data set, and then may recheck the output of the encryption program (e.g., encryption and encryption validation may be iteratively applied until the data set passes the encryption validation) prior to writing the data set to a storage repository. As the encryption validation method uses the entropy calculation of the data set, the entropy validation may be applied in the absence of knowledge of the statistical patterns of the data set.

Aspects of the disclosure are initially described in the context of an environment supporting an on-demand database service. Aspects of the disclosure are further illustrated by and described with reference to flowcharts, process flows, apparatus diagrams, and system diagrams that relate to methods for encryption validation.

FIG. 1 illustrates an example of a system 100 for cloud computing that supports guided capture methodologies in accordance with various aspects of the present disclosure. The system 100 includes cloud clients 105, contacts (e.g., client devices 110), cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user/client device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple client devices 110. The interactions 130 may include communications, opportunities, purchases, sales, or any other interaction between a cloud client 105 and a client device 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Client devices 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. In some cases, the client device 110 may be an example of a user device, such as a server (e.g., client device 110-*a*), a laptop (e.g., client device 110-*b*), a smartphone (e.g., client device 110-*c*), or a sensor (e.g., client device 110-*d*). In other cases, the client device 110 may be another computing system. In some cases, the client device 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a client device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a client device 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some ecommerce systems may provide an online marketplace. For example, the cloud platform 115 and/or the data center 120 may host an online marketplace. The online marketplace may receive sensitive data from customers (e.g., buyers or sellers), for example via the client devices 110. A data owner (e.g., an operator of an online marketplace) may encrypt sensitive data before writing the sensitive data to a persistent data store (e.g., at the data center 120), for example, in order to comply with financial or privacy regulations. The data owner (e.g., the application that receives sensitive data) may run an encryption program on sensitive data before writing the sensitive data to a database to tokenize or encrypt the data. For example, sensitive data may include a set of credit card numbers, a set of bank account numbers, a set of security codes, a set of names, and/or a set of billing or shipping addresses. In some examples, the encryption program may be run at the cloud platform or at the data center 120. A data owner may check whether sensitive data is actually or sufficiently encrypted using an encryption validation component 145 (e.g., an encryption validation application/program). In some examples, the encryption validation component 145 may communicate with cloud platform 115 via a network connection 155. In some examples, the encryption validation component 145 may run at the cloud platform 115 or the data center 120.

Entropy is a measure of the randomness of a data set. Any human or computer generated set of data has some statistical pattern (e.g., some statistical patterns at some positions of a data set). Some positions may have more patterns, while other positions may have less or no patterns. The statistical patterns reduce entropy of a data set. A byproduct of a strong encryption program is introducing randomness into the data set. For example, a strong encryption program may use a true random number generator using a random source (e.g., thermal noise, clock drift, or quantum properties), while a weak encryption program may use a deterministic pseudo random number generator (which may use a mathematical algorithm to produce a pseudo random number.

A data set may include a set of character strings (e.g., a set of credit card numbers, a set of bank account numbers, a set of routing numbers, a set of security codes, a set of names, and/or a set of billing or shipping addresses). The encryption validation component 145 may calculate the observed entropy for corresponding positions of the character strings of a data set (e.g., the observed entropy of the first position of all the character strings, the observed entropy of the second position of all the character strings, etc.) and compare the observed entropy for the corresponding positions to an entropy benchmark for the data set to determine whether the data set is encrypted. Accordingly, the encryption validation component 145 may determine whether a data set is encrypted without using metadata associated with the data set by checking the entropy of the data set, without using pattern matching methods subject to failure when FPE is used, and without the tediousness or data leakage issues associated with human checking of encryption.

For example, the entropy benchmark may represent the determined entropy of a position of the character string if all of the characters for that position of the character strings in the data set were completely random. If the observed entropy of each corresponding position of the character strings is within a threshold of the entropy benchmark (or if the position with the lowest observed entropy value is within the threshold of the entropy benchmark), the encryption validation component 145 may determine that the data set was sufficiently encrypted. If the encryption validation component 145 determines that the data set was sufficiently encrypted, a data manager, for example at the cloud platform 115, may write the data set to a storage repository, for example at the data center 120. If the observed entropy of each corresponding position of the character strings is not within a threshold of the entropy benchmark, the encryption validation component 145 may determine that the data set was not sufficiently encrypted. In such cases, a data manager, for example, at the cloud platform 115, may apply an encryption program to the data set, and then may recheck the output of the encryption program via the encryption validation component 145 (e.g., encryption and encryption validation may be iteratively applied until the data set passes the encryption validation) prior to writing the data set to a storage repository, for example at the data center 120. As the encryption validation component 145 may verify encryption based upon the entropy calculation of the data set, the encryption validation component 145 may validate encryption in the absence of knowledge of the statistical patterns of the data set, and without reliance upon metadata or introducing human checking of encryption.

As an example, in an online marketplace, a buyer using a client device 110 may view a listing of an item on the online marketplace, which may be hosted on the cloud platform 115 and/or the data center 120. The buyer may enter their credit card information to complete a purchase of the item (e.g., via an interaction 130). The online marketplace may encrypt and store credit card information for multiple such buyers in a storage repository at the data center 120. The encryption validation component 145 may analyze the stored credit card information using an entropy-based encryption validation method as described herein. Based on the entropy-based encryption validation method, the encryption validation component 145 may generate and/or transmit an encryption report that indicates whether the credit card information is encrypted. In some cases, the encryption report may be presented at a graphical user interface (GUI), for example at a cloud client 105. For example, an administrator of the online marketplace may view the encryption report via the GUI. In some examples, the GUI may present an entropy level. For example, the GUI may present a numeric representation of the entropy level, or the entropy level may be indicated in a way that represents the risk that the credit card information is not encrypted (e.g., based on a scale or a location of the presentation of the entropy level in the GUI). An administrator of the online marketplace, informed by the encryption report, may then select via the GUI to run the credit card information through a particular encryption program or may select a storage location for the credit card information.

In some examples, the encryption validation component 145 may transmit messages to a set of cloud clients 105 in scenarios where the risk that the credit card information is not encrypted is particularly high (e.g., the calculated entropy level of one or more corresponding positions is below a threshold) and/or the risk that unencrypted credit card information has been stored at a particular storage location (e.g., a short term location) for an extended period. For example, the messages may prompt an administrator of an online marketplace to perform additional encryption programs on the credit card information or to perform additional analysis about whether a potential security breach occurred.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
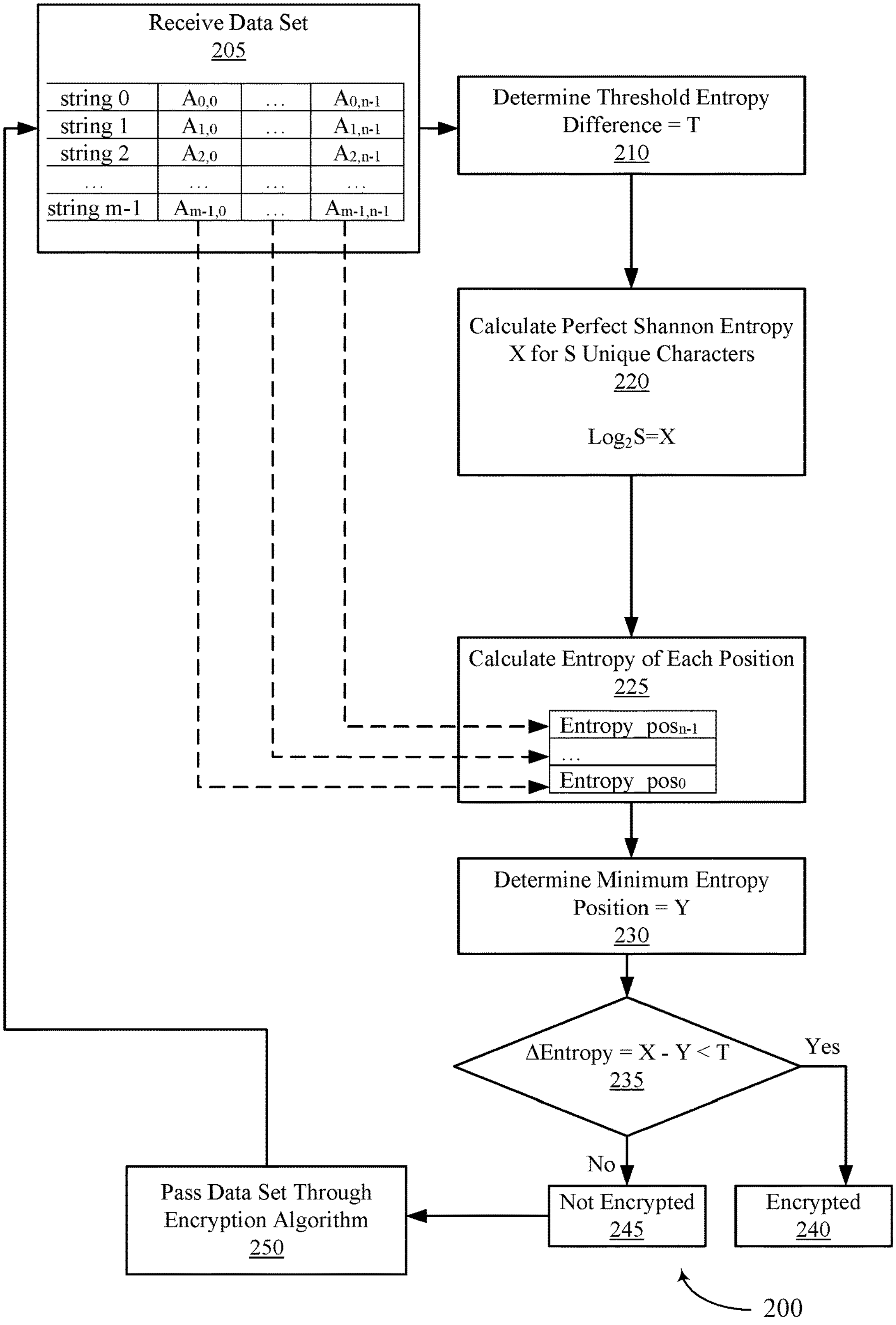
FIG. 2 illustrates an example of a flowchart that supports methods for encryption validation in accordance with aspects of the present disclosure.

FIG. 2 illustrates an example of a flowchart 200 that supports methods for encryption validation in accordance with aspects of the present disclosure. Aspects of the flowchart 200 may implement, or be implemented by, aspects of the system 100. For example, aspects of the flowchart 200 may be implemented by a cloud platform 115, a data center 120, and/or an encryption validation component 145.

At 205, an encryption validation component 145 may receive a data set including a set of m character strings (e.g., including string 0, string 1, string 2, . . . , string m−1). Each string includes a set of n characters (e.g., string 0 includes characters $A_{0,0}$ to $A_{0,n-1}$, string 1 includes characters $A_{1,0}$ to $A_{1,n-1}$, string 2 includes characters $A_{2,0}$ to $A_{2,n-1}$, etc.). For example, the set of character strings may be a set of credit cards, a set of bank account numbers, a set of routing numbers, a set of addresses, a set or names, or a set of security codes. The encryption validation component 145 may receive the data set from the cloud platform 115 or a storage repository (e.g., a temporary data store) at the data center 120 before the data set is written to a persistent data store at the data center 120.

At 210, the encryption validation component 145 may determine a threshold entropy difference, T. In some examples, T may be set by an operator, for example based on experimental data. At 220, the encryption validation component 145 may determine a benchmark entropy X for the character positions of each column based on the number S of unique characters that may be included in the character positions. For example, for a set of credit card numbers, each position may have a value between 0-9, so S=10. X may be given by $\mathrm{Log}_2 S=X$, so for a set of credit card numbers $\log_2 10=3.32=X$. A column may refer to the corresponding positions in the character string. For example, column 0 of the data set includes $A_{0,0}$ to $A_{m-1}$,0 column 1 includes $A_{0,1}$ to $A_{m-1,1}$, etc.

At 225, the encryption validation component 145 may determine the actual entropy of each character position/column of the data set. For example, the encryption validation component 145 may calculate the entropy of the position/column "0" (shown as entropy_pos$_0$) which includes characters $A_{0,0}$ to $A_{m-1,0}$. The encryption validation component 145 may similarly calculate the entropy for the other positions/columns "1" to "n−1." The actual entropy H(x) for each column may be given by $$H(x) = \sum_{i \in x} p(i) \log_2 \frac{1}{p(i)},$$

where p(i) refers to the probability of a character i being in the set. For example, if there are 10 character strings, and 4 of the characters in the first column are the number "1", then p(1) equals 0.4.

At 230, the encryption validation component 145 may determine which character position/column has a minimum entropy value Y of all of the character positions/columns of the data set. At 235, the encryption validation component 145 may compare the minimum entropy value Y to the benchmark entropy value X (e.g., the perfect Shannon Entropy X) to determine if the difference between the minimum entropy value Y to the benchmark entropy value X (ΔEntropy) is less than the threshold T.

Based on the comparison at 235, the encryption validation component 145 may output an indication of whether the data set is encrypted. For example, if $X-Y<T$, then at 240, the encryption validation component 145 may output an indication that the data set is encrypted. A data management component (e.g., at the cloud platform 115 or the data center 120) may accordingly write the data set to a persistent data store (e.g., at the data center 120).

In some examples, if X−Y is not <T, then at 245 the encryption validation component 145 may output an indication that the data set is not encrypted. In some examples, a data management component (e.g., at the cloud platform 115 or the data center 120) may run the data set through an encryption algorithm at 250 prior to writing the data set to a persistent data store (e.g., at the data center 120). In some examples, after running the data set through the encryption algorithm at 250, but prior to writing the data set to a persistent data store, the data management component may again check whether the data set is encrypted via the encryption validation component 145 (e.g., the encryption validation component may perform steps 205-235 on the output of step 250). According, a data management component and/or an encryption validation component 145 may iteratively encrypt a data set and check to ensure that the data set is sufficiently encrypted prior to writing the data set to a persistent data store.

In some examples, a client device (e.g., a cloud client 105 or a client device 110) may receive the indication of whether the data set is encrypted (e.g., at 240 and/or 245). In some examples, the indication may be an electronic message that includes a report that is transmitted via a communication network (e.g., via one or more of the connection 140, the network connection 135, the network connection 155, or the interactions 130). In some examples, the indication may be an alarm, which may alert a user of a client device (e.g., a cloud client 105 or a client device 110) that the data set is not encrypted. In some examples, the electronic message that includes a report of whether the data set is encrypted may be displayed on a display screen at the client device (e.g., a cloud client 105 or a client device 110). In some examples, the location on the display screen may correspond to or indicate whether the data set is encrypted (e.g., the message being displayed on the middle of the screen may indicate the data set is not encrypted and the message being displayed on the bottom of the screen may indicate the data set is encrypted). The client device may provide an indication to either store the data set in the storage repository or pass the data set through an encryption algorithm and whether to recheck the output of the encryption algorithm.

Table 1 below shows an example data set that may be received at 205. For example, the data set in Table 1 may be a set of credit cards. An example threshold determined at 210 may be 0.1. As described herein, for a set of credit card numbers, each position may have a value between 0-9, so S=10, and $\mathrm{Log}_2 S=X$, so for a set of credit card numbers $\log_2 10=3.32=X$. In Table 1, some numeric characters (0-9) have been replaced by the letter "X," which represents a numeric character.

example of Table 1, as the last digit may be a checksum, the last digit may be the minimum entropy position if the data set is unencrypted.

Accordingly, at 235, the encryption validation component 145 may compare the minimum entropy (3.16 for column 15) to the benchmark entropy 3.32, and as 3.32-3.16=0.16>1, then the encryption validation component 145 may determine that the data set of Table 1 is not encrypted (or is not sufficiently encrypted). Accordingly, for the data set of Table 1, the encryption validation component 145 may output an indication at 245 that the data set is not encrypted.

Figure 3:
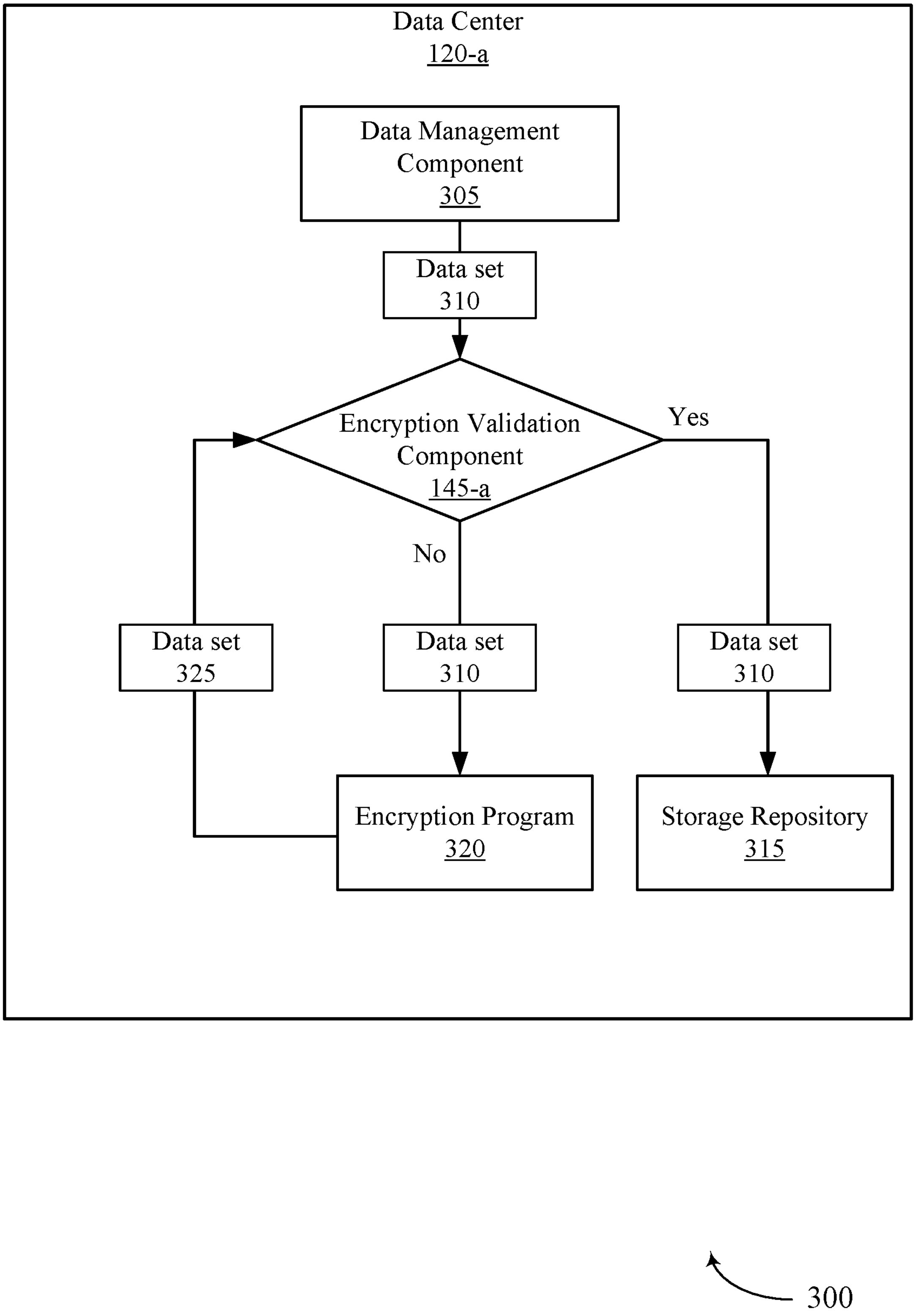
FIG. 3 illustrates an example of a system that supports methods for encryption validation in accordance with aspects of the present disclosure.

FIG. 3 illustrates an example of a system 300 that supports methods for encryption validation in accordance with aspects of the present disclosure. Aspects of the system 300 may implement, or be implemented by, aspects of the system 100. For example, the system 300 may be implemented at a data center 120-*a*, which may be an example of a data center 120 as described herein. The system 300 may include an encryption validation component 145-*a*, which may be an example of an encryption validation component 145 as described herein.

A data management component 305 at the data center 120-*a* may transmit/send a data set 310 (e.g., a set of character strings) to the encryption validation component 145-*a*. The encryption validation component 145-*a* may determine whether the data set is encrypted using an entropy-based encryption validation method described herein, for example, with respect to FIG. 2. The encryption validation component 145-*a* may output an indication of whether the data set 310 is encrypted. If the encryption validation component 145-*a* indicates that the data set is encrypted, then the data set may be written to a storage repository 315 (e.g., a persistent data store), for example, by the data management component 305. If the encryption validation component 145-*a* indicates that the data set is encrypted, then the data set may be run through an encryption program 320 to produce an encrypted data set 325. In some examples, the encrypted data set 325 may be written to the storage repository 315 (e.g., a persistent data store), for example by the data management component 305. In some examples, the encrypted data set 325 may be checked by the encryption validation component 145-*a* prior to be written to the storage repository 315.

TABLE 1

| position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Card 0 | 5 | 1 | 7 | 8 | 8 | X | 5 | X | 6 | X | 4 | X | X | 2 | 4 | 5 |
| Card 1 | 4 | 2 | 6 | 3 | 2 | X | X | 5 | X | 1 | X | 1 | X | 2 | 2 | 7 |
| Card 2 | 6 | 0 | 1 | 1 | 8 | 1 | 8 | X | 8 | X | 6 | 4 | X | X | X | 9 |
| Card 3 | 5 | 1 | 8 | 9 | 1 | X | X | 3 | X | X | 2 | X | 8 | 8 | 7 | 9 |
| Card 4 | 4 | 7 | 1 | 1 | 3 | 5 | 6 | X | X | X | 1 | X | X | 7 | 1 | 6 |
| Card 5 | 6 | 0 | 1 | 1 | 1 | X | X | 9 | X | X | 1 | 5 | X | 5 | 2 | 5 |
| Card 6 | 5 | 4 | 2 | 9 | 6 | 4 | X | X | X | 9 | X | 6 | 8 | X | 5 | 4 |
| . . . | | | | | | | | | . . . | | | | | | | |
| Card n-1 | 4 | 1 | 9 | 2 | 3 | X | 2 | 9 | X | X | X | 7 | X | 5 | 1 | 1 |

Figure 4:
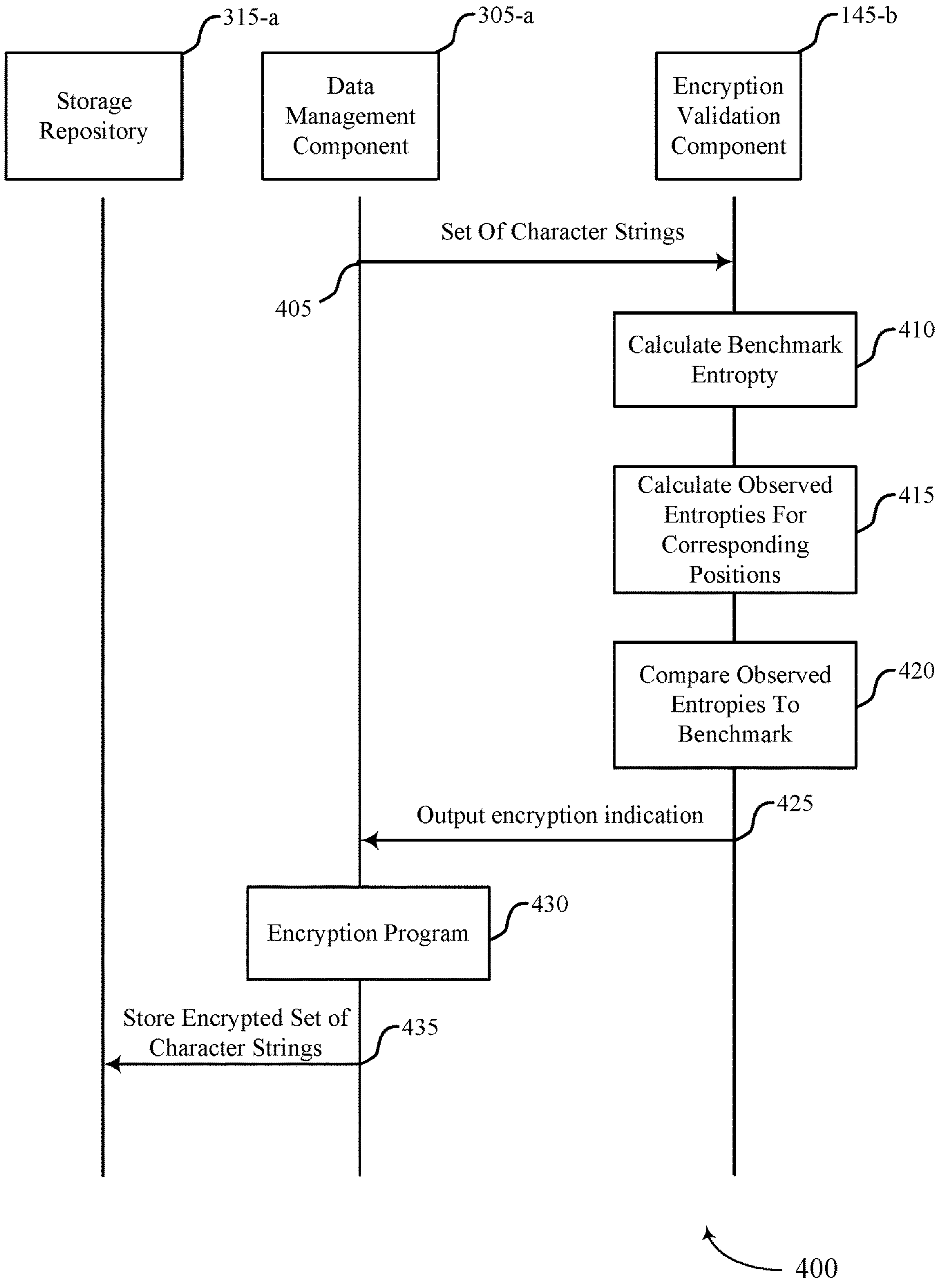
FIG. 4 illustrates an example of a process flow that supports methods for encryption validation in accordance with aspects of the present disclosure.

At 225, the encryption validation component 145 may determine the entropy for each position/column of the data set of Table 1. For example, the entropy of column 0 may be calculated as 3.18, the entropy of column 1 may be calculated as 3.17, the entropy of column 2 may be calculated as 3.19, . . . , and column 15 (the last column) may have an entropy of 3.16. Credit card numbers may have patterns, for example Discover credit card numbers may begin with "6011", Visa credit card numbers may start with a "4," Mastercard credit card numbers may start with a "5," and the last digit of each may be a checksum. As shown in the FIG. 4 illustrates an example of a process flow 400 that supports methods for encryption validation in accordance with aspects of the present disclosure. The process flow 400 may implement or be implemented by a system 100 of FIG. 1 or a system 300 of FIG. 3. For example, the process flow 400 includes an encryption validation component 145-*b*, which may be an example of an encryption validation component 145 as described herein. The process flow 400 may include a data management component 305-*a* which may be an example of a data management component 305 as described herein. The process flow 400 may include a storage repository 315-*a* which may be an example of a storage repository 315 as described herein. In the following description of the process flow 400, the operations between the encryption validation component 145-*b*, the data management component 305-*a*, and the storage repository 315-*a* may be transmitted in a different order than the example order shown, or the operations performed by the encryption validation component 145-*b*, the data management component 305-*a*, and the storage repository 315-*a* may be performed in different orders or at different times. Some operations may also be omitted from the process flow 400, and other operations may be added to the process flow 400.

At 405, the encryption validation component 145-*b* may receive a data set including a set of character strings, for example from the data management component 305-*a*. In some examples, the data set may be received from a cloud client 105 or a client device 110. In some examples, the data set may be received from a temporary storage repository, for example at the data center 120.

At 410, the encryption validation component 145-*b* may calculate a benchmark entropy value for the set of character strings based on a set of possible characters for corresponding positions of the set of character strings.

At 415, the encryption validation component 145-*b* may calculate an observed entropy value for each corresponding position of the set of character strings based on actual characters included in the set of character strings.

At 420, the encryption validation component 145-*b* may compare the observed entropy value for each corresponding position of the set of character strings to the benchmark entropy value. In some examples, comparing the observed entropy for each corresponding position involves determining which corresponding position has the minimum observed entropy of all of the corresponding positions of the set of character strings, and comparing that minimum observed entropy value to the benchmark entropy value. In some examples, comparing the observed entropy for each corresponding position involves comparing the calculated observed entropy value for each corresponding position to the benchmark.

At 425, the encryption validation component 145-*b* may output an encryption indication for the data set based on the comparison at 420. In some examples, comparing the observed entropy for each corresponding position involves determining whether a respective difference between the observed entropy value for each corresponding position of the set of character strings and the benchmark entropy value satisfies a threshold. In some examples, outputting the encryption indication involves outputting an indication that the data set is encrypted based on each respective difference satisfying the threshold (or based on a minimum entropy satisfying the threshold). In such examples, at 435 the data management component 305-*a* may write the data set to a storage repository 315-*a*.

In some examples, the indication at 425 may indicate that the data set is not encrypted, for example based on at least one respective difference not satisfying the threshold (or the minimum entropy not satisfying the threshold). If the indication at 425 indicates that the data set is not encrypted, in some examples, the data management component 430 may move the data set from a first storage repository to a second storage repository (e.g., different from the storage repository 315-*a* used for encrypted data), where the data set is received from the first storage repository. If the indication at 420 indicates that the data set is not encrypted, in some examples at 430, the data management component 305-*a* may run the data set through an encryption program to generate a second data set. In some examples, the data management component 305-*a* may then write the second data set to the storage repository 315-*a* at 435. In some examples, the data management component 305-*a* may send the second data set to the encryption validation component 145-*b* to check whether the second data set is sufficiently encrypted. Accordingly, in some examples, the data set may be iteratively run through the encryption program and the encryption validation method until the data set satisfies the encryption validation of the encryption validation component, at which point the data set may be written to the storage repository 315-*a*.

In some examples, the encryption indication at 425 may be sent to a client device (e.g., a cloud client 105 or a client device 110), and a user of the client device may transmit an indication of whether to store the data set in the storage repository 315-*a* or to run the data set through an encryption program. The user of the client device may also indicate which storage repository to store the data set in and/or which encryption program to use to encrypt the data set.

Figure 5:
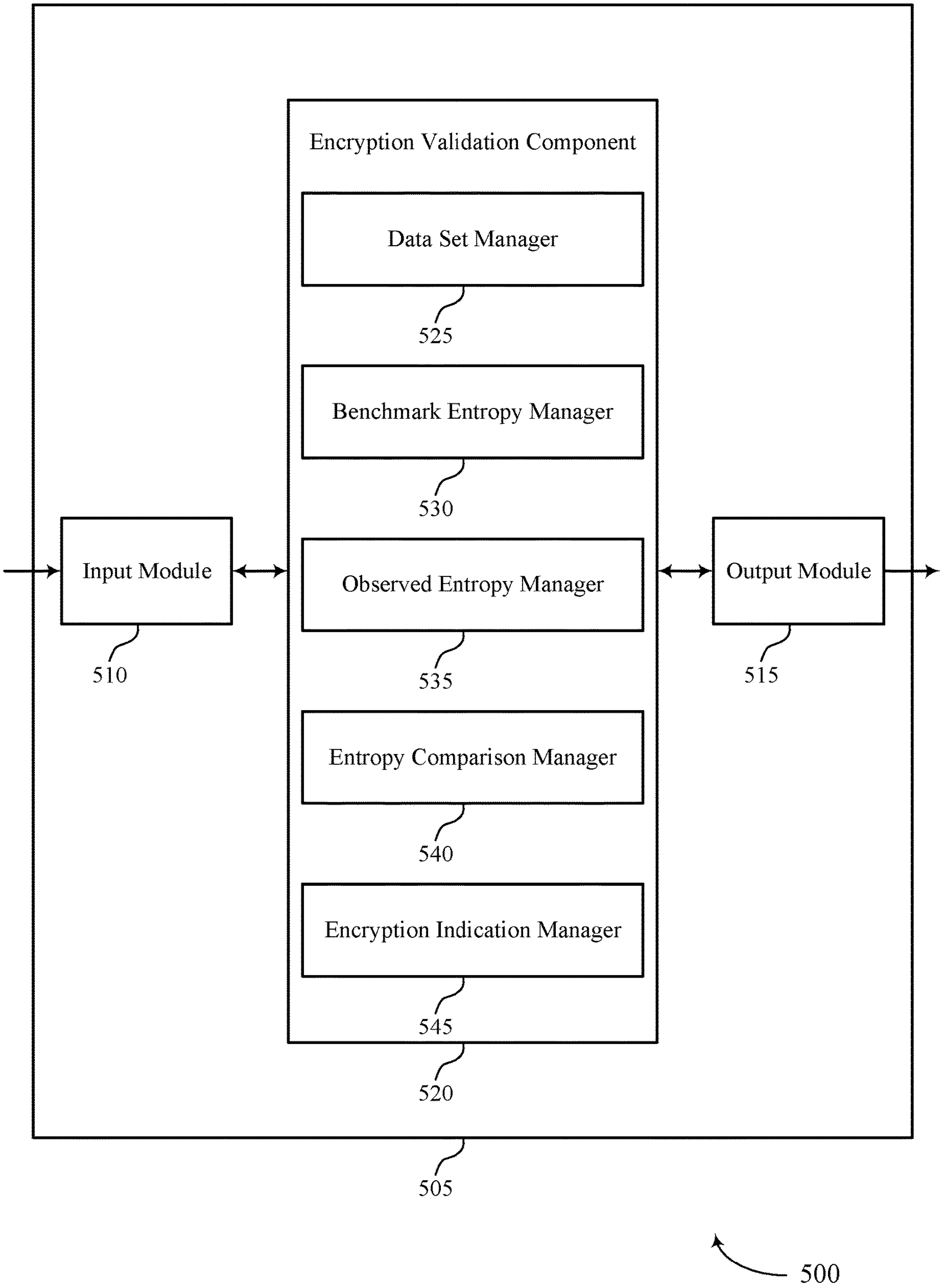
FIG. 5 shows a block diagram of an apparatus that supports methods for encryption validation in accordance with aspects of the present disclosure.

FIG. 5 shows a block diagram 500 of a device 505 that supports methods for encryption validation in accordance with aspects of the present disclosure. The device 505 may include an input module 510, an output module 515, and an encryption validation component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the encryption validation component 520 to support methods for encryption validation. In some cases, the input module 510 may be a component of an I/O controller 710 as described with reference to FIG. 7.

The output module 515 may manage output signals for the device 505. For example, the output module 515 may receive signals from other components of the device 505, such as the encryption validation component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the encryption validation component 520 may include a data set manager 525, a benchmark entropy manager 530, an observed entropy manager 535, an entropy comparison manager 540, an encryption indication manager 545, or any combination thereof. In some examples, the encryption validation component 520, or various components thereof, may be configured to perform various operations (e.g., receiving, monitoring, transmitting) using or otherwise in cooperation with the input module 510, the output module 515, or both. For example, the encryption validation component 520 may receive information from the input module 510, send information to the output module 515, or be integrated in combination with the input module 510, the output module 515, or both to receive information, transmit information, or perform various other operations as described herein.

The data set manager 525 may be configured as or otherwise support a means for receiving a data set including a set of character strings. The benchmark entropy manager 530 may be configured as or otherwise support a means for calculating a benchmark entropy value for the set of character strings based on a set of possible characters for corresponding positions of the set of character strings. The observed entropy manager 535 may be configured as or otherwise support a means for calculating an observed entropy value for each corresponding position of the set of character strings based on actual characters included in the set of character strings. The entropy comparison manager 540 may be configured as or otherwise support a means for comparing the observed entropy value for each corresponding position of the set of character strings to the benchmark entropy value. The encryption indication manager 545 may be configured as or otherwise support a means for outputting an encryption indication for the data set based on the comparison.

Figure 6:
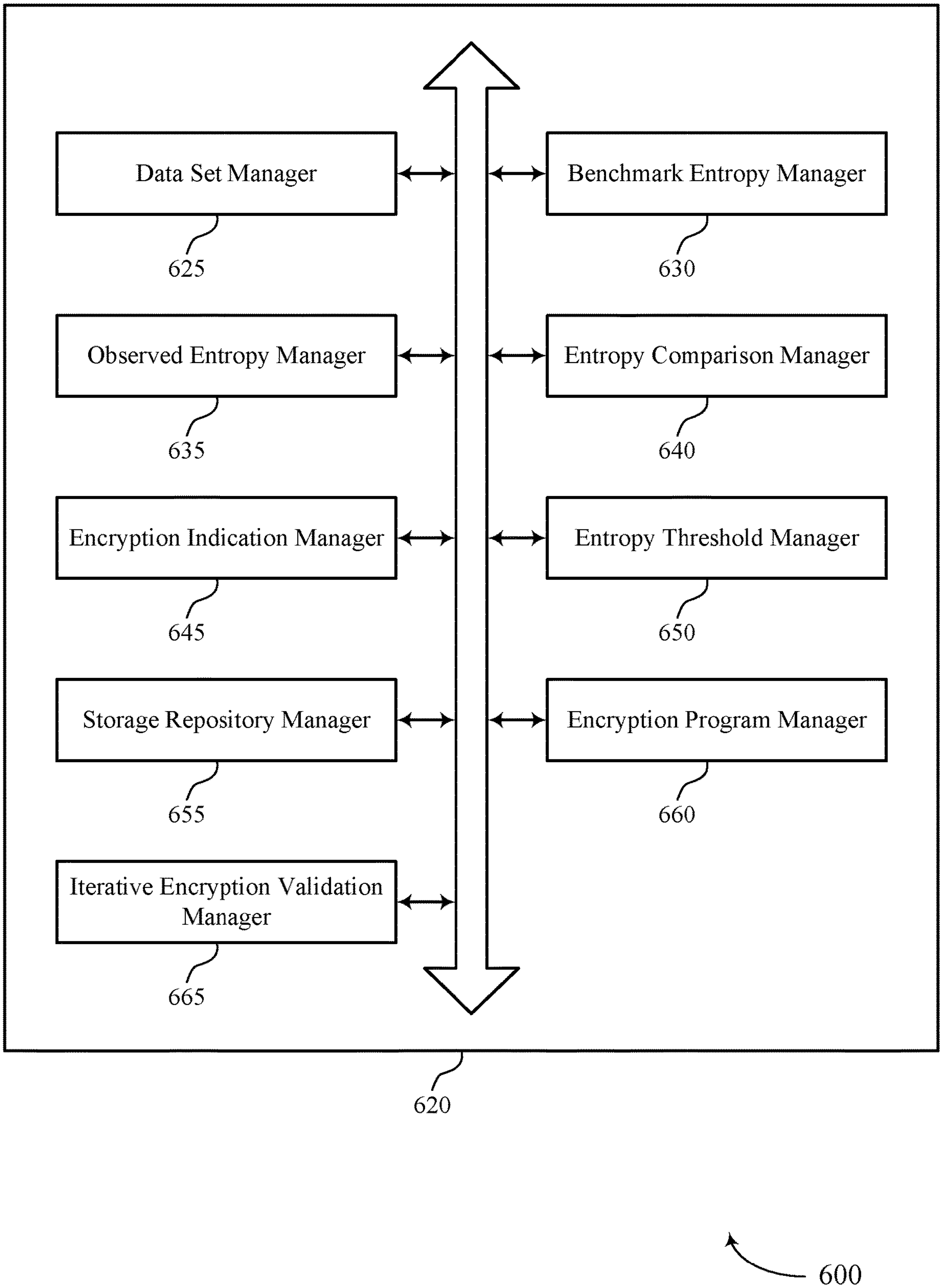
FIG. 6 shows a block diagram of an encryption validation component that supports methods for encryption validation in accordance with aspects of the present disclosure.

FIG. 6 shows a block diagram 600 of an encryption validation component 620 that supports methods for encryption validation in accordance with aspects of the present disclosure. The encryption validation component 620 may be an example of aspects of an encryption validation component or an encryption validation component 520, or both, as described herein. The encryption validation component 620, or various components thereof, may be an example of means for performing various aspects of methods for encryption validation as described herein. For example, the encryption validation component 620 may include a data set manager 625, a benchmark entropy manager 630, an observed entropy manager 635, an entropy comparison manager 640, an encryption indication manager 645, an entropy threshold manager 650, a storage repository manager 655, an encryption program manager 660, an iterative encryption validation manager 665, or any combination thereof. Each of these components may communicate, directly or indirectly, with one another (e.g., via one or more buses).

The data set manager 625 may be configured as or otherwise support a means for receiving a data set including a set of character strings. The benchmark entropy manager 630 may be configured as or otherwise support a means for calculating a benchmark entropy value for the set of character strings based on a set of possible characters for corresponding positions of the set of character strings. The observed entropy manager 635 may be configured as or otherwise support a means for calculating an observed entropy value for each corresponding position of the set of character strings based on actual characters included in the set of character strings. The entropy comparison manager 640 may be configured as or otherwise support a means for comparing the observed entropy value for each corresponding position of the set of character strings to the benchmark entropy value. The encryption indication manager 645 may be configured as or otherwise support a means for outputting an encryption indication for the data set based on the comparison.

In some examples, each possible character of the set of possible characters is equally likely to occur at each character position in the set of character strings.

In some examples, to support comparing the observed entropy value for each corresponding position of the set of character strings to the benchmark entropy value, the entropy threshold manager 650 may be configured as or otherwise support a means for determining whether a respective difference between the observed entropy value for each corresponding position of the set of character strings and the benchmark entropy value satisfies a threshold.

In some examples, to support outputting the encryption indication, the encryption indication manager 645 may be configured as or otherwise support a means for outputting an indication that the data set is encrypted based on each respective difference satisfying the threshold.

In some examples, the storage repository manager 655 may be configured as or otherwise support a means for writing the data set to a storage repository based on the indication that the data set is encrypted.

In some examples, to support outputting the encryption indication, the encryption indication manager 645 may be configured as or otherwise support a means for outputting an indication that the data set is not encrypted based on at least one respective difference not satisfying the threshold.

In some examples, the storage repository manager 655 may be configured as or otherwise support a means for moving the data set from a first storage repository to a second storage repository via a network based on the indication that the data set is not encrypted, wherein the data set is received from the first storage repository.

In some examples, the encryption program manager 660 may be configured as or otherwise support a means for running the data set through an encryption program to generate a second data set based on the indication that the data set is not encrypted.

In some examples, the storage repository manager 655 may be configured as or otherwise support a means for writing the second data set to a storage repository.

In some examples, the iterative encryption validation manager 665 may be configured as or otherwise support a means for iteratively running the data set through an encryption program and checking the data set for an indication that the data set is encrypted.

Figure 7:
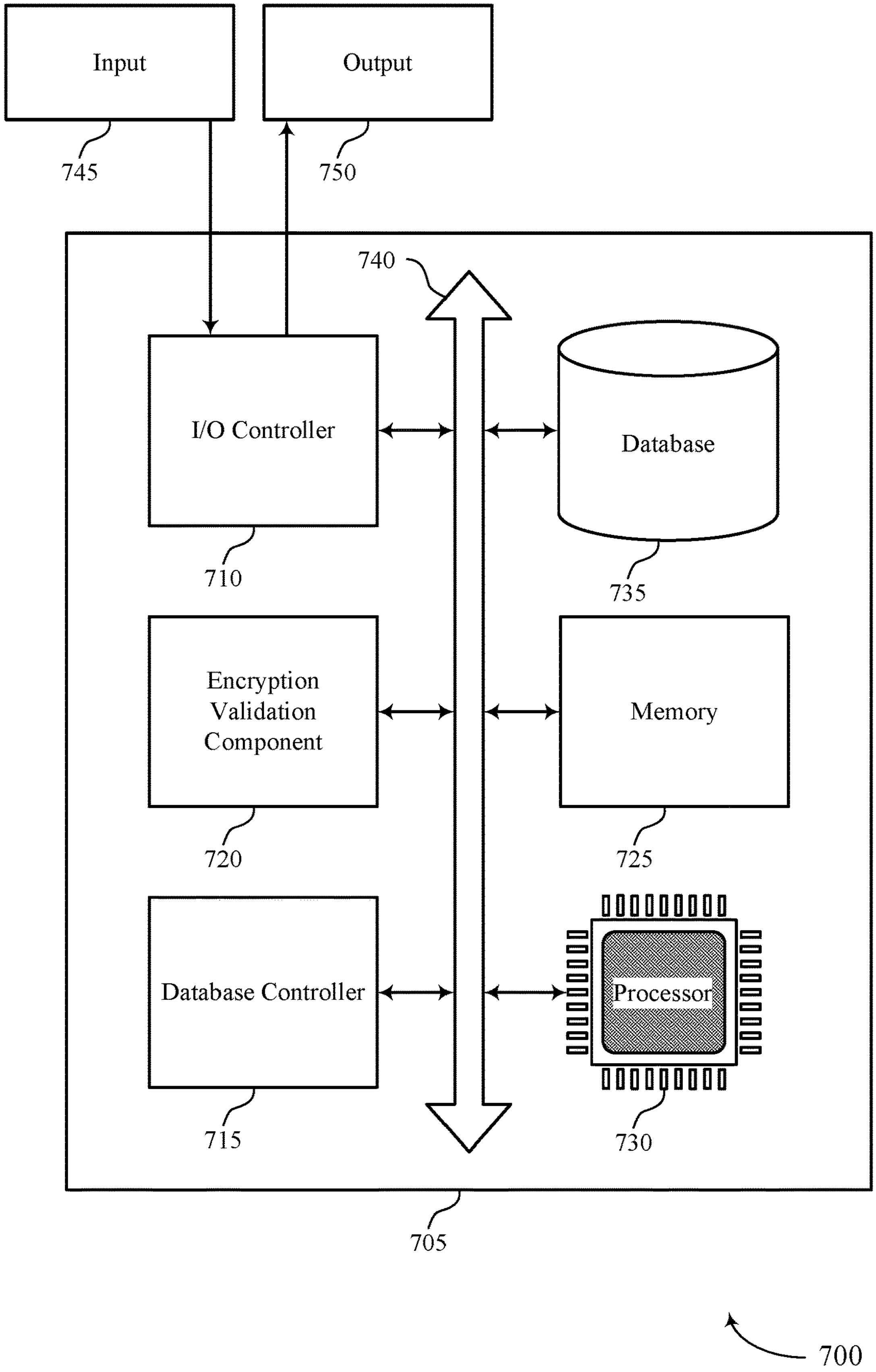
FIG. 7 shows a diagram of a system including a device that supports methods for encryption validation in accordance with aspects of the present disclosure.

FIG. 7 shows a diagram of a system 700 including a device 705 that supports methods for encryption validation in accordance with aspects of the present disclosure. The device 705 may be an example of or include the components of a device 505 as described herein. The device 705 may include components for bi-directional data communications including components for transmitting and receiving communications, such as an encryption validation component 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory ROM. The memory 725 may store computer-readable, computer-executable software including instructions that, when executed, cause the processor 730 to perform various functions described herein. In some cases, the memory 725 may contain, among other things, a Basic Input/Output System (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting methods for encryption validation).

For example, the encryption validation component 720 may be configured as or otherwise support a means for receiving a data set including a set of character strings. The encryption validation component 720 may be configured as or otherwise support a means for calculating a benchmark entropy value for the set of character strings based on a set of possible characters for corresponding positions of the set of character strings. The encryption validation component 720 may be configured as or otherwise support a means for calculating an observed entropy value for each corresponding position of the set of character strings based on actual characters included in the set of character strings. The encryption validation component 720 may be configured as or otherwise support a means for comparing the observed entropy value for each corresponding position of the set of character strings to the benchmark entropy value. The encryption validation component 720 may be configured as or otherwise support a means for outputting an encryption indication for the data set based on the comparison.

By including or configuring the encryption validation component 720 in accordance with examples as described herein, the device 705 may support techniques for faster, more secure, and input format agnostic encryption validation.

Figure 8:
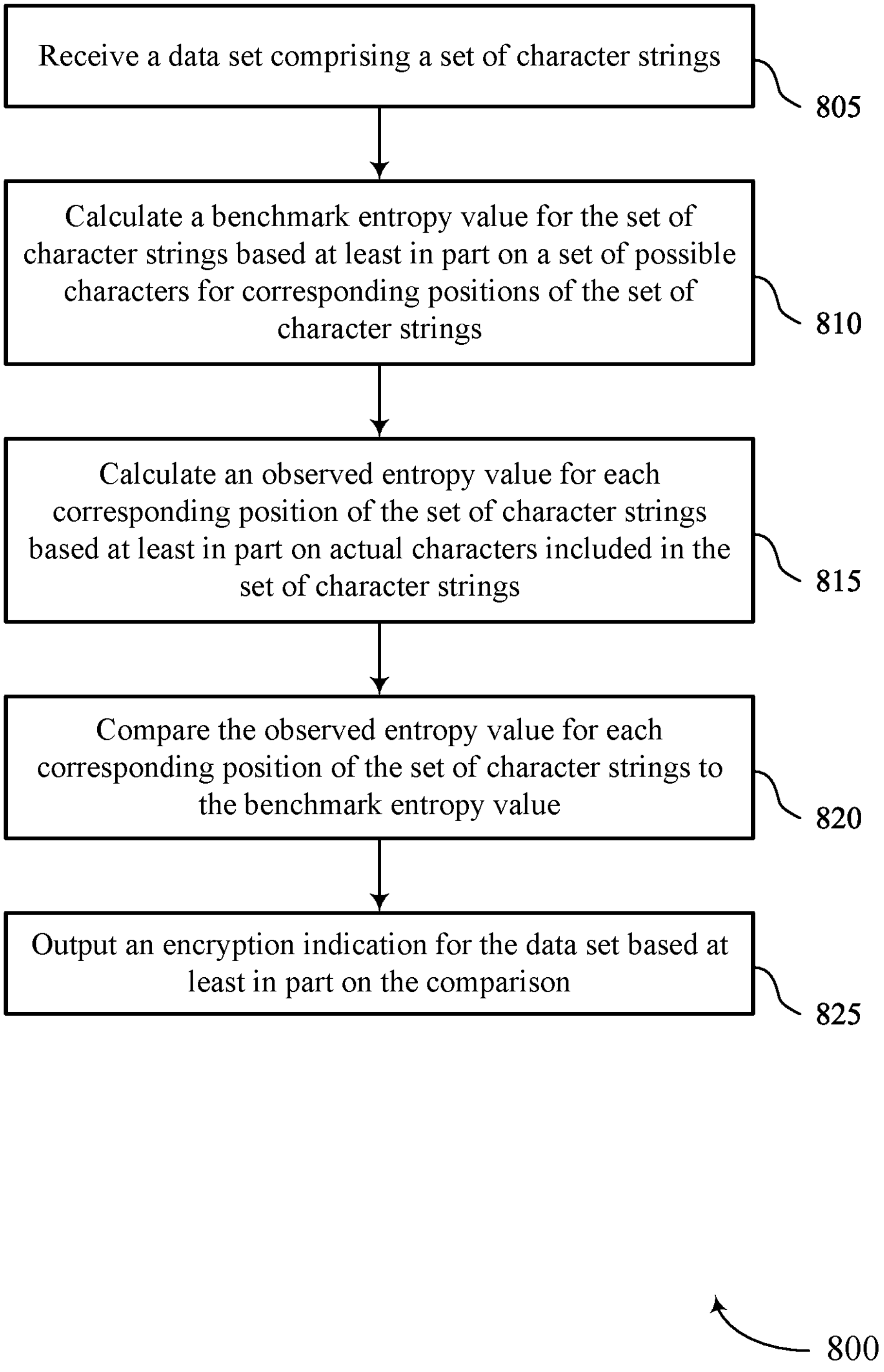
FIGS. 8 through 11 show flowcharts illustrating methods that support methods for encryption validation in accordance with aspects of the present disclosure.

FIG. 8 shows a flowchart illustrating a method 800 that supports methods for encryption validation in accordance with aspects of the present disclosure. The operations of the method 800 may be implemented by a encryption validation component or its components as described herein. For example, the operations of the method 800 may be performed by a Encryption validation component as described with reference to FIGS. 1 through 7. In some examples, an Encryption validation component may execute a set of instructions to control the functional elements of the Encryption validation component to perform the described functions. Additionally, or alternatively, the Encryption validation component may perform aspects of the described functions using special-purpose hardware.

At 805, the method may include receiving a data set including a set of character strings. The operations of 805 may be performed in accordance with examples as disclosed herein. In some examples, aspects of the operations of 805 may be performed by a data set manager 625 as described with reference to FIG. 6.

At 810, the method may include calculating a benchmark entropy value for the set of character strings based on a set of possible characters for corresponding positions of the set of character strings. The operations of 810 may be performed in accordance with examples as disclosed herein. In some examples, aspects of the operations of 810 may be performed by a benchmark entropy manager 630 as described with reference to FIG. 6.

At 815, the method may include calculating an observed entropy value for each corresponding position of the set of character strings based on actual characters included in the set of character strings. The operations of 815 may be performed in accordance with examples as disclosed herein. In some examples, aspects of the operations of 815 may be performed by an observed entropy manager 635 as described with reference to FIG. 6.

At 820, the method may include comparing the observed entropy value for each corresponding position of the set of character strings to the benchmark entropy value. The operations of 820 may be performed in accordance with examples as disclosed herein. In some examples, aspects of the operations of 820 may be performed by an entropy comparison manager 640 as described with reference to FIG. 6.

At 825, the method may include outputting an encryption indication for the data set based on the comparison. The operations of 825 may be performed in accordance with examples as disclosed herein. In some examples, aspects of the operations of 825 may be performed by an encryption indication manager 645 as described with reference to FIG. 6.

Figure 9:
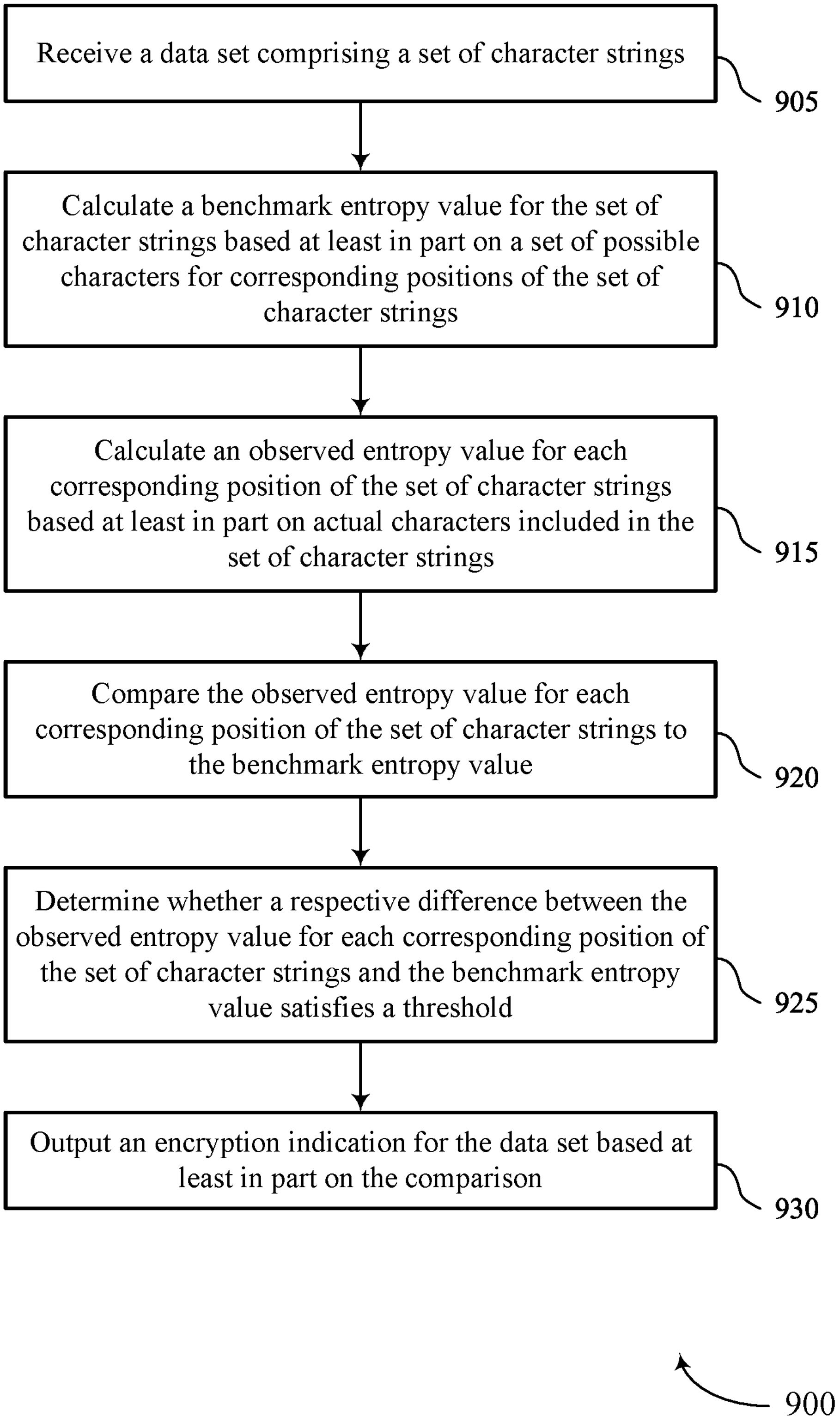

FIG. 9 shows a flowchart illustrating a method 900 that supports methods for encryption validation in accordance with aspects of the present disclosure. The operations of the method 900 may be implemented by an encryption validation component or its components as described herein. For example, the operations of the method 900 may be performed by an encryption validation component as described with reference to FIGS. 1 through 7. In some examples, an encryption validation component may execute a set of instructions to control the functional elements of the encryption validation component to perform the described functions. Additionally, or alternatively, the encryption validation component may perform aspects of the described functions using special-purpose hardware.

At 905, the method may include receiving a data set including a set of character strings. The operations of 905 may be performed in accordance with examples as disclosed herein. In some examples, aspects of the operations of 905 may be performed by a data set manager 625 as described with reference to FIG. 6.

At 910, the method may include calculating a benchmark entropy value for the set of character strings based on a set of possible characters for corresponding positions of the set of character strings. The operations of 910 may be performed in accordance with examples as disclosed herein. In some examples, aspects of the operations of 910 may be performed by a benchmark entropy manager 630 as described with reference to FIG. 6.

At 915, the method may include calculating an observed entropy value for each corresponding position of the set of character strings based on actual characters included in the set of character strings. The operations of 915 may be performed in accordance with examples as disclosed herein. In some examples, aspects of the operations of 915 may be performed by an observed entropy manager 635 as described with reference to FIG. 6.

At 920, the method may include comparing the observed entropy value for each corresponding position of the set of character strings to the benchmark entropy value. The operations of 920 may be performed in accordance with examples as disclosed herein. In some examples, aspects of the operations of 920 may be performed by an entropy comparison manager 640 as described with reference to FIG. 6.

At 925, the method may include determining whether a respective difference between the observed entropy value for each corresponding position of the set of character strings and the benchmark entropy value satisfies a threshold. The operations of 925 may be performed in accordance with examples as disclosed herein. In some examples, aspects of the operations of 925 may be performed by an entropy threshold manager 650 as described with reference to FIG. 6.

At 930, the method may include outputting an encryption indication for the data set based on the comparison. The operations of 930 may be performed in accordance with examples as disclosed herein. In some examples, aspects of the operations of 930 may be performed by an encryption indication manager 645 as described with reference to FIG. 6.

Figure 10:
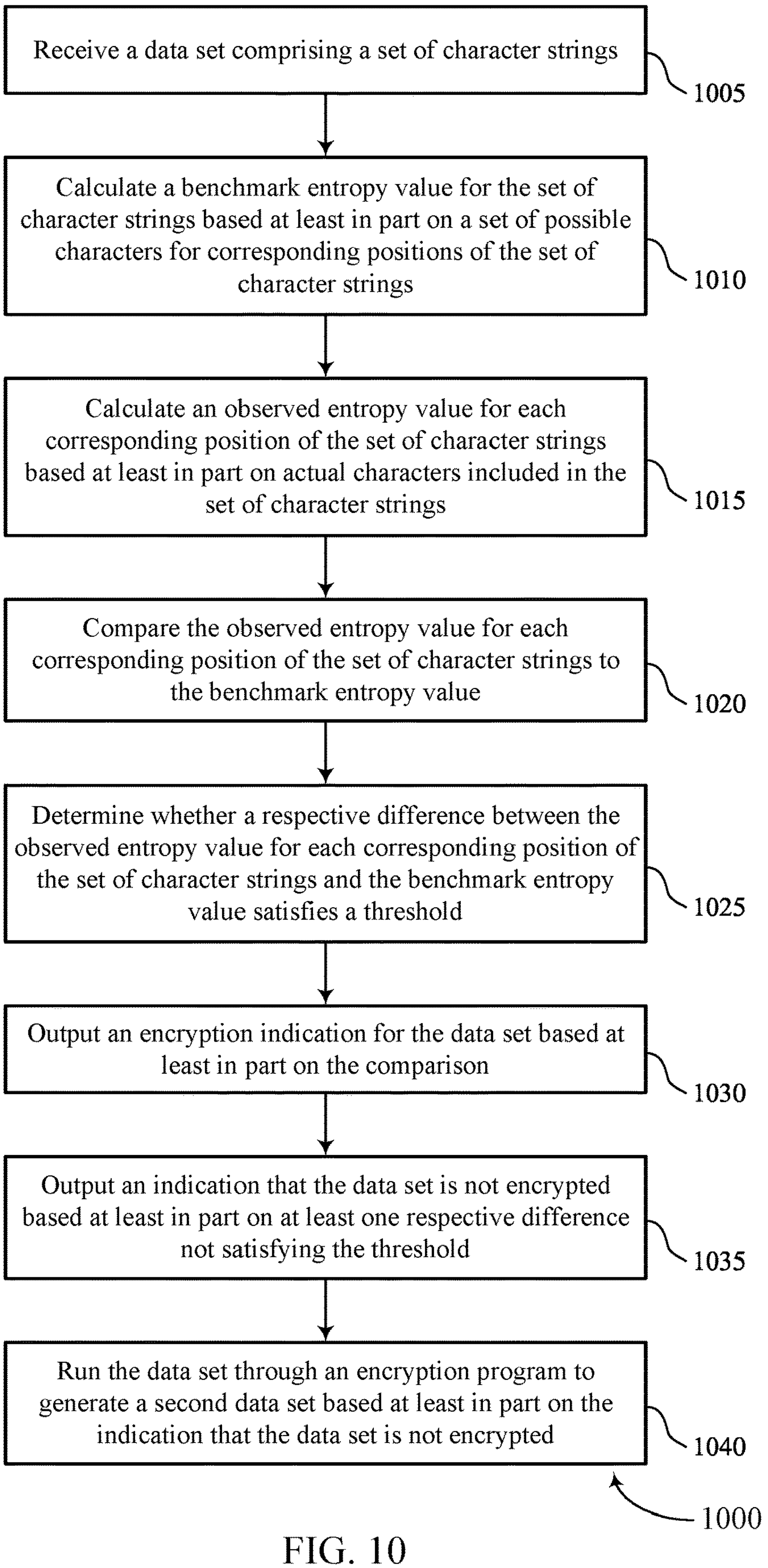

FIG. 10 shows a flowchart illustrating a method 1000 that supports methods for encryption validation in accordance with aspects of the present disclosure. The operations of the method 1000 may be implemented by an encryption validation component or its components as described herein. For example, the operations of the method 1000 may be performed by an encryption validation component as described with reference to FIGS. 1 through 7. In some examples, an encryption validation component may execute a set of instructions to control the functional elements of the encryption validation component to perform the described functions. Additionally, or alternatively, the encryption validation component may perform aspects of the described functions using special-purpose hardware.

At 1005, the method may include receiving a data set including a set of character strings. The operations of 1005 may be performed in accordance with examples as disclosed herein. In some examples, aspects of the operations of 1005 may be performed by a data set manager 625 as described with reference to FIG. 6.

At 1010, the method may include calculating a benchmark entropy value for the set of character strings based on a set of possible characters for corresponding positions of the set of character strings. The operations of 1010 may be performed in accordance with examples as disclosed herein. In some examples, aspects of the operations of 1010 may be performed by a benchmark entropy manager 630 as described with reference to FIG. 6.

At 1015, the method may include calculating an observed entropy value for each corresponding position of the set of character strings based on actual characters included in the set of character strings. The operations of 1015 may be performed in accordance with examples as disclosed herein. In some examples, aspects of the operations of 1015 may be performed by an observed entropy manager 635 as described with reference to FIG. 6.

At 1020, the method may include comparing the observed entropy value for each corresponding position of the set of character strings to the benchmark entropy value. The operations of 1020 may be performed in accordance with examples as disclosed herein. In some examples, aspects of the operations of 1020 may be performed by an entropy comparison manager 640 as described with reference to FIG. 6.

At 1025, the method may include determining whether a respective difference between the observed entropy value for each corresponding position of the set of character strings and the benchmark entropy value satisfies a threshold. The operations of 1025 may be performed in accordance with examples as disclosed herein. In some examples, aspects of the operations of 1025 may be performed by an entropy threshold manager 650 as described with reference to FIG. 6.

At 1030, the method may include outputting an encryption indication for the data set based on the comparison. The operations of 1030 may be performed in accordance with examples as disclosed herein. In some examples, aspects of the operations of 1030 may be performed by an encryption indication manager 645 as described with reference to FIG. 6.

At 1035, the method may include outputting an indication that the data set is not encrypted based on at least one respective difference not satisfying the threshold. The operations of 1035 may be performed in accordance with examples as disclosed herein. In some examples, aspects of the operations of 1035 may be performed by an encryption indication manager 645 as described with reference to FIG. 6.

At 1040, the method may include running the data set through an encryption program to generate a second data set based on the indication that the data set is not encrypted. The operations of 1040 may be performed in accordance with examples as disclosed herein. In some examples, aspects of the operations of 1040 may be performed by an encryption program manager 660 as described with reference to FIG. 6.

Figure 11:
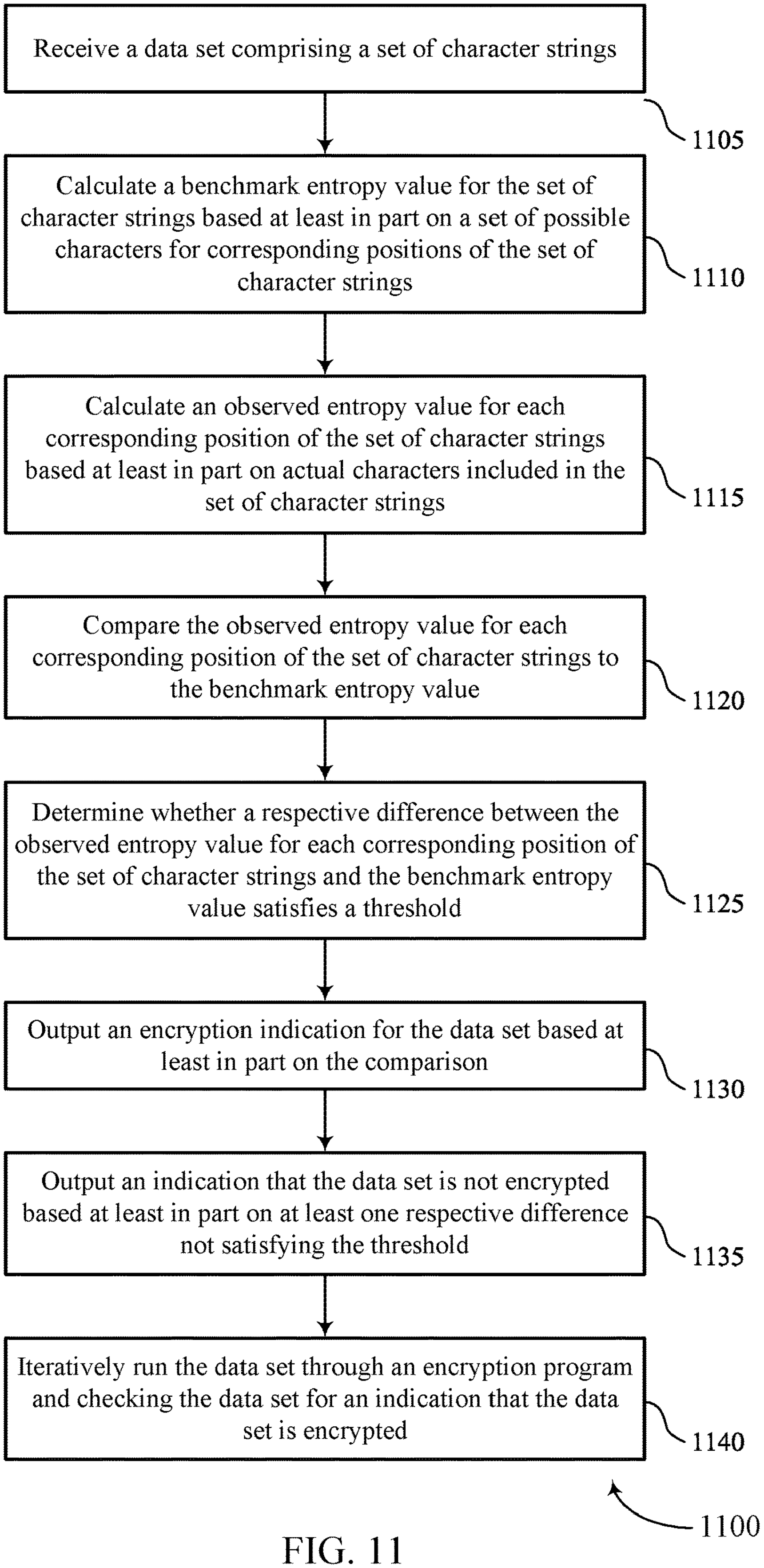

FIG. 11 shows a flowchart illustrating a method 1100 that supports methods for encryption validation in accordance with aspects of the present disclosure. The operations of the method 1100 may be implemented by an encryption validation component or its components as described herein. For example, the operations of the method 1100 may be performed by an encryption validation component as described with reference to FIGS. 1 through 7. In some examples, an encryption validation component may execute a set of instructions to control the functional elements of the encryption validation component to perform the described functions. Additionally, or alternatively, the encryption validation component may perform aspects of the described functions using special-purpose hardware.

At 1105, the method may include receiving a data set including a set of character strings. The operations of 1105 may be performed in accordance with examples as disclosed herein. In some examples, aspects of the operations of 1105 may be performed by a data set manager 625 as described with reference to FIG. 6.

At 1110, the method may include calculating a benchmark entropy value for the set of character strings based on a set of possible characters for corresponding positions of the set of character strings. The operations of 1110 may be performed in accordance with examples as disclosed herein. In some examples, aspects of the operations of 1110 may be performed by a benchmark entropy manager 630 as described with reference to FIG. 6.

At 1115, the method may include calculating an observed entropy value for each corresponding position of the set of character strings based on actual characters included in the set of character strings. The operations of 1115 may be performed in accordance with examples as disclosed herein. In some examples, aspects of the operations of 1115 may be performed by an observed entropy manager 635 as described with reference to FIG. 6.

At 1120, the method may include comparing the observed entropy value for each corresponding position of the set of character strings to the benchmark entropy value. The operations of 1120 may be performed in accordance with examples as disclosed herein. In some examples, aspects of the operations of 1120 may be performed by an entropy comparison manager 640 as described with reference to FIG. 6.

At 1125, the method may include determining whether a respective difference between the observed entropy value for each corresponding position of the set of character strings and the benchmark entropy value satisfies a threshold. The operations of 1125 may be performed in accordance with examples as disclosed herein. In some examples, aspects of the operations of 1125 may be performed by an entropy threshold manager 650 as described with reference to FIG. 6.

At 1130, the method may include outputting an encryption indication for the data set based on the comparison. The operations of 1130 may be performed in accordance with examples as disclosed herein. In some examples, aspects of the operations of 1130 may be performed by an encryption indication manager 645 as described with reference to FIG. 6.

At 1135, the method may include outputting an indication that the data set is not encrypted based on at least one respective difference not satisfying the threshold. The operations of 1135 may be performed in accordance with examples as disclosed herein. In some examples, aspects of the operations of 1135 may be performed by an encryption indication manager 645 as described with reference to FIG. 6.

At 1140, the method may include iteratively running the data set through an encryption program and checking the data set for an indication that the data set is encrypted. The operations of 1140 may be performed in accordance with examples as disclosed herein. In some examples, aspects of the operations of 1140 may be performed by an iterative encryption validation manager 665 as described with reference to FIG. 6.

A method is described. The method may include receiving a data set including a set of character strings, calculating a benchmark entropy value for the set of character strings based on a set of possible characters for corresponding positions of the set of character strings, calculating an observed entropy value for each corresponding position of the set of character strings based on actual characters included in the set of character strings, comparing the observed entropy value for each corresponding position of the set of character strings to the benchmark entropy value, and outputting an encryption indication for the data set based on the comparison.

An apparatus is described. The apparatus may include a processor, memory coupled with the processor, and instructions stored in the memory. The instructions may be executable by the processor to cause the apparatus to receive a data set including a set of character strings, calculate a benchmark entropy value for the set of character strings based on a set of possible characters for corresponding positions of the set of character strings, calculate an observed entropy value for each corresponding position of the set of character strings based on actual characters included in the set of character strings, compare the observed entropy value for each corresponding position of the set of character strings to the benchmark entropy value, and output an encryption indication for the data set based on the comparison.

Another apparatus is described. The apparatus may include means for receiving a data set including a set of character strings, means for calculating a benchmark entropy value for the set of character strings based on a set of possible characters for corresponding positions of the set of character strings, means for calculating an observed entropy value for each corresponding position of the set of character strings based on actual characters included in the set of character strings, means for comparing the observed entropy value for each corresponding position of the set of character strings to the benchmark entropy value, and means for outputting an encryption indication for the data set based on the comparison.

A non-transitory computer-readable medium storing code is described. The code may include instructions executable by a processor to receive a data set including a set of character strings, calculate a benchmark entropy value for the set of character strings based on a set of possible characters for corresponding positions of the set of character strings, calculate an observed entropy value for each corresponding position of the set of character strings based on actual characters included in the set of character strings, compare the observed entropy value for each corresponding position of the set of character strings to the benchmark entropy value, and output an encryption indication for the data set based on the comparison.

In some examples of the method, apparatuses, and non-transitory computer-readable medium described herein, each possible character of the set of possible characters may be equally likely to occur at each character position in the set of character strings.

In some examples of the method, apparatuses, and non-transitory computer-readable medium described herein, comparing the observed entropy value for each corresponding position of the set of character strings to the benchmark entropy value may include operations, features, means, or instructions for determining whether a respective difference between the observed entropy value for each corresponding position of the set of character strings and the benchmark entropy value satisfies a threshold.

In some examples of the method, apparatuses, and non-transitory computer-readable medium described herein, outputting the encryption indication may include operations, features, means, or instructions for outputting an indication that the data set may be encrypted based on each respective difference satisfying the threshold.

Some examples of the method, apparatuses, and non-transitory computer-readable medium described herein may further include operations, features, means, or instructions for writing the data set to a storage repository based on the indication that the data set may be encrypted.

In some examples of the method, apparatuses, and non-transitory computer-readable medium described herein, outputting the encryption indication may include operations, features, means, or instructions for outputting an indication that the data set may be not encrypted based on at least one respective difference not satisfying the threshold.

Some examples of the method, apparatuses, and non-transitory computer-readable medium described herein may further include operations, features, means, or instructions for moving the data set from a first storage repository to a second storage repository via a network based on the indication that the data set is not encrypted, wherein the data set is received from the first storage repository.

Some examples of the method, apparatuses, and non-transitory computer-readable medium described herein may further include operations, features, means, or instructions for running the data set through an encryption program to generate a second data set based on the indication that the data set may be not encrypted.

Some examples of the method, apparatuses, and non-transitory computer-readable medium described herein may further include operations, features, means, or instructions for writing the second data set to a storage repository.

In some examples of the method, apparatuses, and non-transitory computer-readable medium described herein, iteratively running the data set through an encryption program and checking the data set for an indication that the data set may be encrypted.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:

at least one processor;

memory coupled with the at least one processor; and instructions stored in the memory and executable by the at least one processor to cause the apparatus to perform operations comprising:

receiving, by the at least one processor, a data set comprising a set of character strings in a table of columns and rows;

storing the data set in a temporary data store;

calculating, by the at least one processor, a benchmark entropy value for the set of character strings based at least in part on a set of possible characters for corresponding positions of the set of character strings;

calculating, by the at least one processor, a set of entropy values for the columns, the calculating of the set of entropy values for the columns including calculating an observed entropy value for a column, the column corresponding to a position in the set of character strings, the calculating of the observed entropy value for the column being based at least in part on values in the position in the set of character strings;

comparing, by the at least one processor, the set of entropy values for the columns to the benchmark entropy value;

outputting, by the at least one processor, an encryption indication for the data set based at least in part on the comparison; and selectively writing, by the at least one processor, the data set to a persistent data store based on the encryption indication, the selectively writing of the data set comprising:

determining, by the at least one processor, whether the data set is sufficiently encrypted based on whether the observed entropy value is within a threshold of the benchmark entropy value;

in response to determining that the data set is insufficiently encrypted, encrypting, by the at least one processor, the data set prior to writing, by the at least one processor, the encrypted data set to the persistent data store; and after encrypting the data set in response to determining that the data set is insufficiently encrypted, writing, by the at least one processor, the encrypted data set to the persistent data store, the writing of the encrypted data set to the persistent data store enabling access of the encrypted data set to a cloud client.

2. The apparatus of claim 1, wherein each possible character of the set of possible characters has a probability of occurring at each character position in the set of character strings.

3. The apparatus of claim 1, wherein the instructions to compare the set of entropy values for the columns to the benchmark entropy value are executable by the processor to cause the apparatus to:

determine whether a respective difference between the observed entropy value for each corresponding position of the set of character strings and the benchmark entropy value satisfies a threshold.

4. The apparatus of claim 3, wherein the instructions to output the encryption indication are executable by the processor to cause the apparatus to:

output an indication that the data set is encrypted based on each respective difference satisfying the threshold.

5. The apparatus of claim 4, wherein the instructions are further executable by the processor to cause the apparatus to:

determine whether a data set is encrypted without using metadata associated with the data set by checking the entropy of the data set or without using pattern matching methods subject to failure.

6. The apparatus of claim 3, wherein the instructions to output the encryption indication are executable by the processor to cause the apparatus to:

output an indication that the data set is not encrypted based at least in part on at least one respective difference not satisfying the threshold.

7. The apparatus of claim 6, wherein the instructions are further executable by the processor to cause the apparatus to:

move the data set from a first storage repository to a second storage repository via a network based on the indication that the data set is not encrypted, wherein the data set is received from the first storage repository.

8. The apparatus of claim 6, wherein the instructions are further executable by the processor to cause the apparatus to:

run the data set through an encryption program to generate a second data set based at least in part on the indication that the data set is not encrypted.

9. The apparatus of claim 8, wherein the instructions are further executable by the processor to cause the apparatus to:

write the second data set to a storage repository.

10. The apparatus of claim 6, wherein the instructions are further executable by the processor to cause the apparatus to:

iteratively run the data set through an encryption program and checking the data set for an indication that the data set is encrypted.

11. A computer-implemented method comprising:

receiving, by one or more processors, a data set comprising a set of character strings in a table of columns and rows;

storing, by the one or more processors, the data set in a temporary data store;

calculating, by the one or more processors, a benchmark entropy value for the set of character strings based at least in part on a set of possible characters for corresponding positions of the set of character strings;

calculating, by the one or more processors, a set of entropy values for the columns, the calculating of the set of entropy values for the columns including calculating an observed entropy value for a column, the column corresponding to a position in the set of character strings, the calculating of the observed entropy value for the column being based at least in part on values in the position in the set of character strings;

comparing, by the one or more processors, the set of entropy values for the columns to the benchmark entropy value;

outputting, by the one or more processors, an encryption indication for the data set based at least in part on the comparison; and selectively, by the one or more processors, writing the data set to a persistent data store based on the encryption indication, the selectively writing of the data set comprising:

determining, by the one or more processors, whether the data set is sufficiently encrypted based on whether the observed entropy value is within a threshold of the benchmark entropy value;

in response to determining that the data set is insufficiently encrypted, encrypting, by the one or more processors, the data set prior to writing, by the one or more processors, the encrypted data set to the persistent data store; and after encrypting the data set in response to determining that the data set is insufficiently encrypted, writing, by the one or more processors, the encrypted data set to the persistent data store, the writing of the encrypted data set to the persistent data store enabling access of the encrypted data set to a cloud client.

12. The computer-implemented method of claim 11, wherein each possible character of the set of possible characters has a probability of occurring at each character position in the set of character strings.

13. The computer-implemented method of claim 11, wherein comparing the set of entropy values for the columns to the benchmark entropy value comprises:

determining whether a respective difference between the observed entropy value for each corresponding position of the set of character strings and the benchmark entropy value satisfies a threshold.

14. The computer-implemented method of claim 13, wherein outputting the encryption indication comprises:

outputting an indication that the data set is encrypted based on each respective difference satisfying the threshold.

15. The computer-implemented method of claim 13, wherein outputting the encryption indication comprises:

outputting an indication that the data set is not encrypted based at least in part on at least one respective difference not satisfying the threshold.

16. The computer-implemented method of claim 15, further comprising:

running the data set through an encryption program to generate a second data set based at least in part on the indication that the data set is not encrypted.

17. The computer-implemented method of claim 15, further comprising:

iteratively running the data set through an encryption program and checking the data set for an indication that the data set is encrypted.

18. A non-transitory computer-readable medium storing code, the code comprising instructions executable by at least one processor to perform operations comprising:

receiving, by the at least one processor, a data set comprising a set of character strings;

storing the data set in a temporary data store in a table of columns and rows;

calculating, by the at least one processor, a benchmark entropy value for the set of character strings based at least in part on a set of possible characters for corresponding positions of the set of character strings;

calculating, by the at least one processor, a set of entropy values for the columns, the calculating of the set of entropy values for the columns including calculating an observed entropy value for a column, the column corresponding to a position in the set of character strings, the calculating of the observed entropy value for the column being based at least in part on values in the position in the set of character strings;

comparing, by the at least one processor, the set of entropy values for the columns to the benchmark entropy value;

outputting, by the at least one processor, an encryption indication for the data set based at least in part the comparison; and selectively writing, by the at least one processor, the data set to a persistent data store based on the encryption indication, the selectively writing of the data set comprising:

determining, by the at least one processor, whether the data set is sufficiently encrypted based on whether the observed entropy value is within a threshold of the benchmark entropy value;

in response to determining that the data set is insufficiently encrypted, encrypting, by the at least one processor, the data set prior to writing, by the at least one processor, the encrypted data set to the persistent data store; and after encrypting the data set in response to determining that the data set is insufficiently encrypted, writing, by the at least one processor, the encrypted data set to the persistent data store, the writing of the encrypted data set to the persistent data store enabling access of the encrypted data set to a cloud client.

* * * * *